US009214977B2

(12) United States Patent
Drucker (10) Patent No.: US 9,214,977 B2
(45) Date of Patent: Dec. 15, 2015

(54) REDUCTION OF CEPHALIC ABSORPTION OF RADIATION FROM MOBILE COMMUNICATION DEVICES

(75) Inventor: Elliott H. Drucker, Kirkland, WA (US)

(73) Assignee: Empire Technology Development LLC, Wilmington, DE (US)

( * ) Notice: Subject to any disclaimer, the term of this patent is extended or adjusted under 35 U.S.C. 154(b) by 304 days.

(21) Appl. No.: 13/500,907

(22) PCT Filed: Dec. 28, 2011

(86) PCT No.: PCT/US2011/067617
§ 371 (c)(1),
(2), (4) Date: Apr. 7, 2012

(87) PCT Pub. No.: WO2013/100977
PCT Pub. Date: Jul. 4, 2013

(65) Prior Publication Data
US 2013/0172039 A1   Jul. 4, 2013

(51) Int. Cl.
*H04B 1/3827* (2015.01)
*H04W 52/28* (2009.01)
*H04W 52/36* (2009.01)

(52) U.S. Cl.
CPC ........... *H04B 1/3838* (2013.01); *H04W 52/288* (2013.01); *H04W 52/367* (2013.01); *H04W 52/283* (2013.01); *Y02B 60/50* (2013.01)

(58) Field of Classification Search
None
See application file for complete search history.

(56) References Cited

U.S. PATENT DOCUMENTS

| 7,499,722 | B2 | 3/2009 | McDowell et al. |
| 7,928,925 | B2 | 4/2011 | Zhu et al. |
| 8,023,984 | B2 * | 9/2011 | Jin et al. ......................... 455/522 |
| 2009/0143113 | A1 * | 6/2009 | McDowell et al. ........... 455/572 |
| 2009/0253425 | A1 | 10/2009 | Goldshtein |
| 2010/0056210 | A1 | 3/2010 | Bychkov et al. |
| 2010/0279751 | A1 * | 11/2010 | Pourseyed et al. ......... 455/575.7 |
| 2010/0323746 | A1 * | 12/2010 | Zhang et al. .................. 455/522 |
| 2011/0034135 | A1 * | 2/2011 | Ali et al. ....................... 455/103 |
| 2011/0159920 | A1 * | 6/2011 | Lehmann .................. 455/556.1 |

OTHER PUBLICATIONS

Lucas, See your iphone battery, 2010 http://www.brighthub.com/mobile/iphone/articles/73454.aspx.*
"Evaluating Compliance with FCC Guidelines for Human Exposure to Radiofrequency Electromagnetic Fields." Federal Communications Commission Office of Engineering and Technology. (1997). OET Bulletin 65. Federal Communications Commission; 65 pp.

(Continued)

*Primary Examiner* — Ping Hsieh
*Assistant Examiner* — James Yang
(74) *Attorney, Agent, or Firm* — Turk IP Law, LLC (57) ABSTRACT

Technologies are described for reliably constraining a maximum transmission power of a mobile communication device such as a cellular phone so that RF radiation associated with that transmission and incident to a head of the device's user can be held at or below predetermined "safe" levels. Upon determining an operational or communication mode of the mobile communication device where it is likely to be held against or very near the user's head, its maximum transmit power may be reduced until the near-head operation is completed. The reduction may be to a fixed maximum level or may be adjusted to allow for a maximum amount of radiated energy over a period of time. The reduction may also take into account adjustment factors such as frequency band, modulation, antenna gain, and similar factors.

19 Claims, 6 Drawing Sheets

(56) References Cited

OTHER PUBLICATIONS

"Listen Up: Tips to Help Avoid Cell Phone Radiation Scams" Federal Trade Commission. (Sep. 2011). Retrieved Nov. 29, 2011, http://www.ftc.gov/bcp/edu/pubs/consumer/alerts/alt109.shtm; 2 pp.

Woolston et al., "Do Cell Phone Shields Block Radiation?" Chicagotribune.com. (Aug. 3, 2009) Retrieved Jun. 10, 2011, from http://www.chicagotribune.com/health/chi-tc-health-skeptic-celldonejun26,0,1956147.

International Search Report and Written Opinion PCT/US2011/067617 mailed Feb. 21, 2012.

International Preliminary Report on Patentability for PCT/US2011/067617 filed Dec. 28, 2011, mailed on Jul. 10, 2014, issued Jul. 1, 2014.

* cited by examiner

FIG. 6

REDUCTION OF CEPHALIC ABSORPTION OF RADIATION FROM MOBILE COMMUNICATION DEVICES

CROSS-REFERENCE TO RELATED APPLICATION

This Application is the National Stage filing under 35 U.S.C. §371 of PCT Application Ser. No. PCT/US11/67617 filed on Dec. 28, 2011. The disclosure of the PCT Application is hereby incorporated by reference in its entirety.

BACKGROUND

Unless otherwise indicated herein, the materials described in this section are not prior art to the claims in this application and are not admitted to be prior art by inclusion in this section.

With the proliferation of mobile communication device use, concerns regarding long-term health risks associated with frequent and/or intensive use of handheld mobile communication devices have been on the forefront of regulatory and research communities. The discussions typically focus on the potential increase in risk of developing certain types of brain cancers and/or other maladies, caused by localized heating of brain tissue and/or other biological structures in the head and neck of the user of the mobile communication devices. This heating is the result of absorption of non-ionizing radio frequency ("RF") radiation from mobile devices, most commonly handheld cellular telephones, held in close proximity to the head, typically to the ear of the user for purposes of voice conversation. The radiation is associated with transmission of the reverse channel (mobile communication device transmit, base station receive) radio signal from the mobile device's antenna.

Within any given time period that the head is exposed to radiation from a proximate mobile device, the amount and extent of this localized heating of brain tissue may be proportional to the amount of radiation absorbed, which is in turn proportional to the average power density of the RF signal incident to the local area. For a given orientation between the mobile device's antenna and the user's head the power density of the transmitted signal is proportional to the reverse channel transmit power. In general, during voice calls (which is typically when the mobile communication device is held to the ear) reverse channel transmit power can vary over a very broad dynamic range and is under immediate control by the mobile device. In turn, the mobile communication device is generally compelled by interoperability standards to adjust reverse channel transmit power, up to its maximum possible output, upon instructions from the serving wireless network and sent on the forward channel (base station transmit, mobile communication device receive) from the serving base station. The wireless network may instruct the mobile communication device to adjust reverse channel transmit power so as to accommodate path loss, interference levels, and other variables in the mobile communication device-base station air interface. Generally speaking, the greater the maximum reverse channel transmit power, the more reliably that transmit power can be adjusted to accommodate extant conditions of these variables on the air interface.

Thus, use of mobile communication devices, especially cellular phones, brings a mixture of conflicting aspects. For example, higher maximum reverse channel transmit power may provide better and more reliable service coverage, but increased transmit power may be associated with increased health risks. A mechanical design that enables the device to be positioned against or close to the ear may reduce acoustic interference and provide greater convenience, but may also result in increased RF energy absorption by the user's head.

SUMMARY

The present disclosure generally describes techniques for reduction of cephalic absorption of radiation from mobile communication devices.

According to some examples, a method for reducing cephalic absorption of RF radiation from mobile communication devices may include determining an operation mode of a mobile communication device; determining whether the operation mode involves a near-head operation; and if the operation mode of the mobile communication device involves the near-head operation, reducing a maximum transmit power of the mobile communication device from a first level to a second level.

According to other examples, a mobile communication device adapted to provide communication services may include a transceiver module, a memory, and a processor coupled to the transceiver module and the memory. The processor may execute instructions stored in the memory, determine an operation mode of a mobile communication device; determine whether the operation mode involves a near-head operation; and if the operation mode of the mobile communication device involves the near-head operation, reduce a maximum transmit power from a first level to a second level.

According to further examples, a computer-readable storage medium may have instructions stored thereon for reducing cephalic absorption of RF radiation from mobile communication devices. The instructions may include determining an operation mode of a mobile communication device; determining whether the operation mode involves a near-head operation; and if the operation mode of the mobile communication device involves the near-head operation, reducing a maximum transmit power of the mobile communication device from a first level to a second level.

According to yet other examples, a network controller for a wireless network facilitating wireless communications between base stations of the wireless network and mobile communication devices may be adapted to reduce cephalic absorption of radiation. The network controller may include a memory and a processor coupled to the memory. By executing instructions stored in the memory, the processor may receive an indication from a mobile communication device through one of direct means and indirect means that the mobile communication device is operating in a constrained maximum transmit power mode based on the mobile communication device determining an operation mode that involves a near-head operation, and adjust at least one from a set of: one or more operations, one or more configurations, and/or one or more parameters of the network, to accommodate a reduced maximum transmit power from the mobile communication device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to reducing cephalic absorption of radiation from mobile communication devices.

Briefly stated, technologies are described for reliably constraining a maximum transmission power of a mobile communication device such as a cellular phone so that RF radiation associated with that transmission and incident to a head of the device's user can be held at or below predetermined "safe" levels. Upon determining an operational or communication mode of the mobile communication device, its maximum transmit power may be reduced until the near-head operation is completed. The reduction may be to a fixed maximum level or may be adjusted to allow for a maximum amount of radiated energy over a period of time. The reduction may also take into account adjustment factors such as frequency, modulation, antenna gain, and similar factors.

Figure 1:
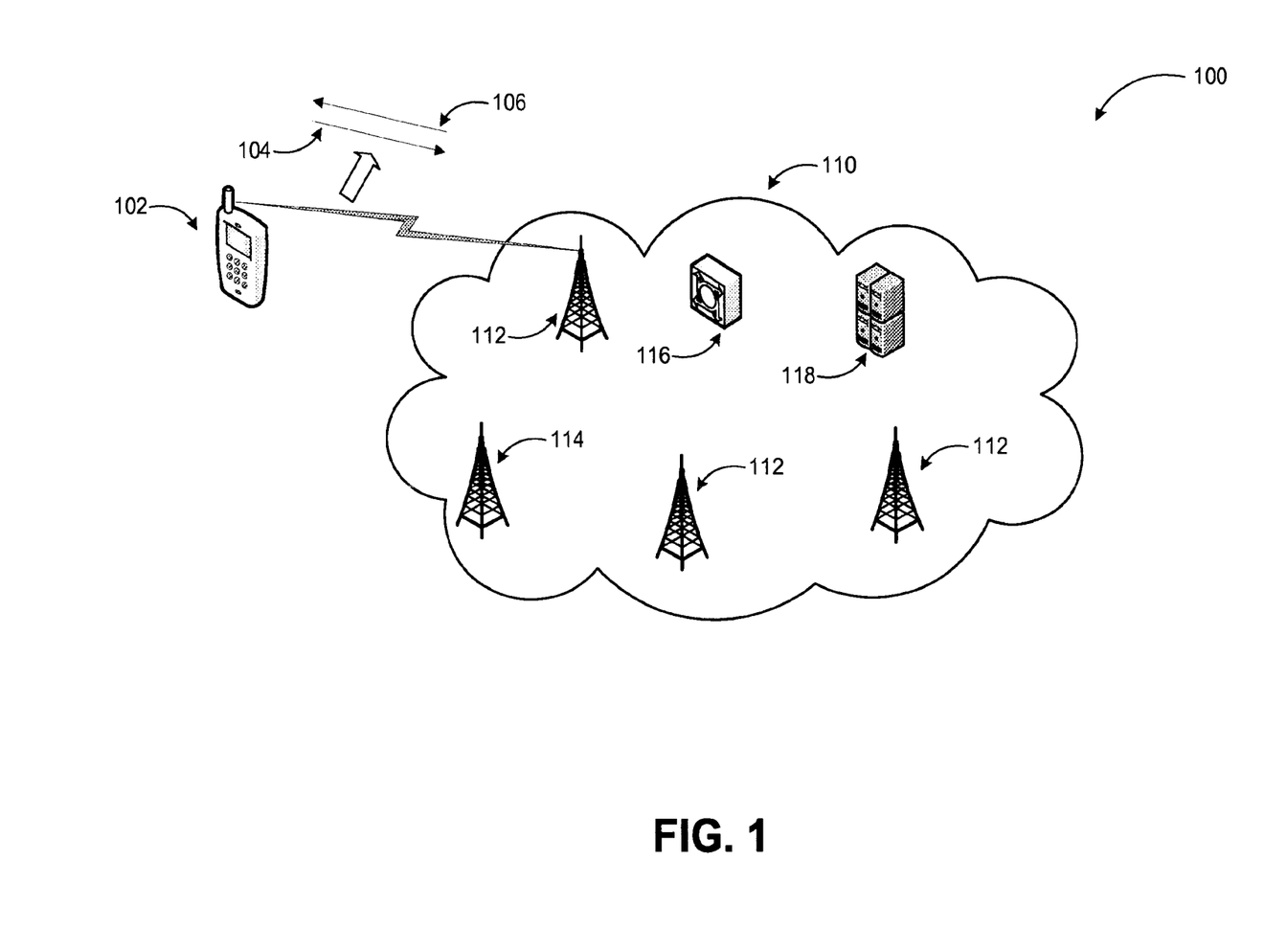
FIG. 1 conceptually illustrates a wireless communication environment, where mobile communication devices may be used for communication.

FIG. 1 conceptually illustrates a wireless communication environment, where mobile communication devices may be used for communication, arranged in accordance with at least some embodiments described herein.

A mobile communication device as used herein refers to wireless communication devices such as cellular phones, smart phones, or handheld computing devices with communication capability that may be used in a near-head operation mode, where an antenna of the device may be in close proximity of a user's head such that RF energy absorbed by the head due to the device transmission may be a concern.

In the example wireless networked system of diagram 100, network 110 may include a number of infrastructure components such as base stations 112, servers 118, and special purpose equipment 116 (e.g., routers). Network 110 may enable communication of various forms between users. For example, audio communication, video communication, data exchange, conferencing, application exchange, text messaging, and similar forms of communication may be facilitated depending on user preferences and device capabilities. A communication enabled by network 110 may be between two or more users of the network or between one or more users of the network and one or more entities that are not users of the network.

Most of the above-listed forms of communication involve a bidirectional communication. Thus, the device (e.g., device 102) transmits (104) a wireless signal to one or more base station(s) (112) and receives (106) a wireless signal from one or more base station(s).

When the mobile communication device is a small form factor device, such as a handheld cellular phone, used for audio communication (possibly among other things), it is likely to be used near its user's head at least some of the time when the device is transmitting. Some portion of its emitted RF radiation may thereby be absorbed by the user's head and neck, which is a source of concern to regulatory agencies and the public in general. The portion of RF energy radiated by such a mobile communication device that is absorbed by the user's head and neck is generally much lower, and thus of much less concern, when the device is not positioned close to the user's head.

Figure 2:
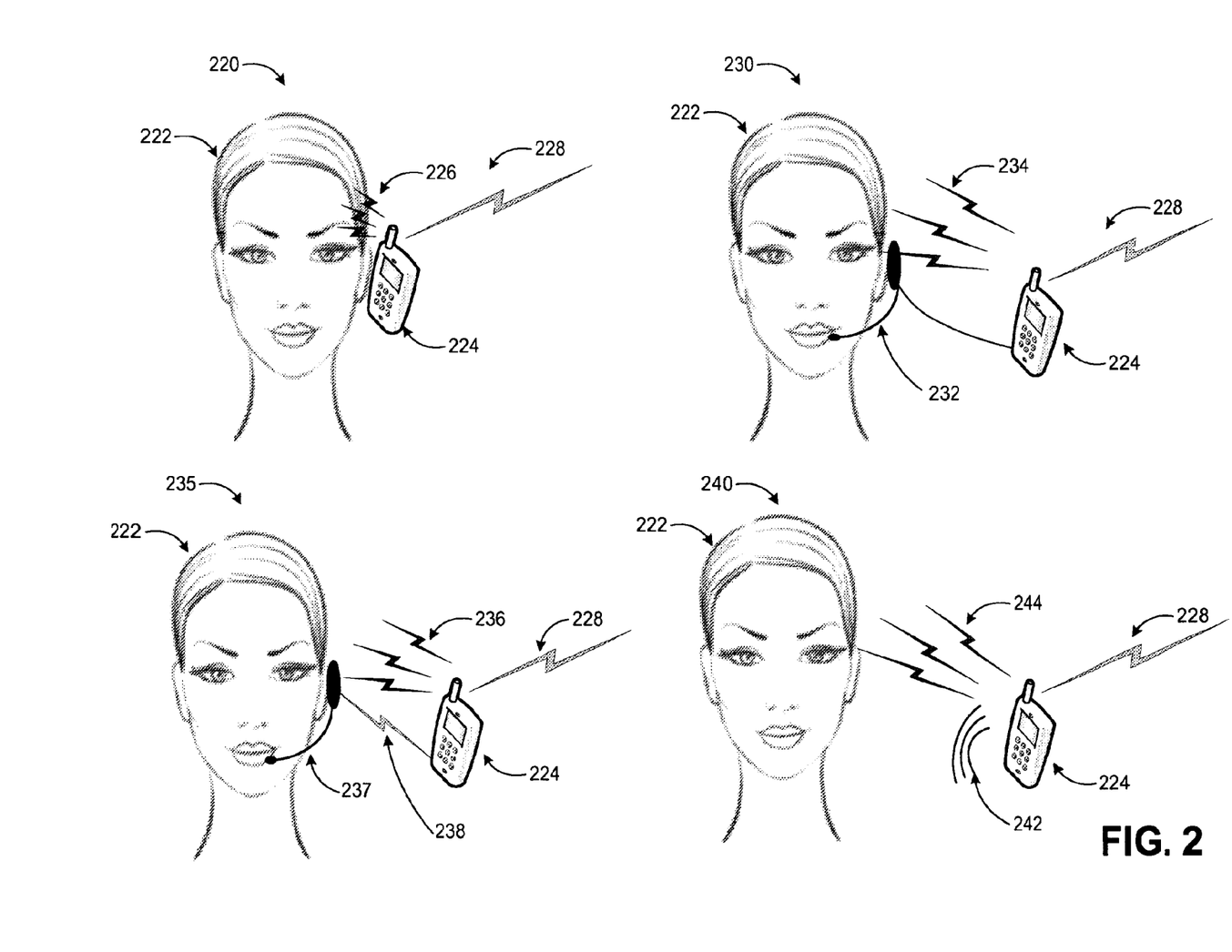
FIG. 2 illustrates example scenarios of a mobile communication device use with different cephalic radiation absorption effects.

FIG. 2 illustrates example scenarios of different configurations of mobile communication device usage with different cephalic radiation absorption effects, arranged in accordance with at least some embodiments described herein.

Four different scenarios are shown in FIG. 2. In the first scenario 220, mobile phone 224 is used in a near-head operation mode (e.g., user holding the integral ear piece of the phone close to her ear). Thus, when the mobile phone 224 transmits a signal 228 to communicate with a base station, a relatively large amount of RF energy 226 is absorbed by the user's head 222. According to the second scenario 230, the mobile phone 224 is used with a wire-connected head set 232. As typically used in this configuration, and compared to the first scenario 220, the antenna of the mobile communication device 224 is substantially farther away from the head 222 during communication, and the RF radiation absorbed 234 by the head 222 is significantly reduced. According to the third scenario 235 the mobile phone 224 is used with a wireless head set 237. As typically used in this configuration, and compared to the first scenario 220, the antenna of the mobile communication device 224 is substantially farther away from the head 222 during communication, and the RF radiation absorbed 236 by the head 222 is significantly reduced. The RF signal 238 that connects the mobile phone 224 to the headset 237 is typically of very low power and thus does not pose a health concern.

The fourth scenario 240 shows the mobile phone 224 being used in a speaker mode, wherein a loudspeaker device embedded in or connected to the mobile phone 224 conveys the receive audio signal 242 to the user 222. (Not shown, in speaker mode a microphone embedded in or connected to the mobile phone 224 is typically configured so as to enable reception of the user's voice from some distance.) As typically used in this configuration, and compared to the first scenario 220, the mobile phone 224 is held much farther away from the user's head during communication, resulting in the RF radiation absorbed 244 by the head 222 being significantly reduced.

An operation of a mobile communication device according to some embodiments is based on the premise that "phone-to-the-ear" or near-head operation is almost invariably associated with forward channel (mobile communication device receive) audio signal being routed by the mobile communication device to a special-purpose audio output element, i.e. the mobile device's integral earpiece. In this case, maximum instantaneous or time-averaged reverse channel transmit power may be constrained. If forward channel audio is otherwise routed, for example to a remote headset (scenarios 230 and 235) or to an integral or remote loudspeaker (scenario 240), or if the transmission of the mobile communication device is associated with an activity that does not involve a forward channel audio signal (i.e. an activity other than a voice call), then it may be assumed that the mobile communication device is most likely situated at least a distance away from its user's head such that if it transmits at its maximum (unconstrained) power level, the resulting amount of RF energy absorbed by the user's head and neck is low enough to not pose health concerns. In these cases, maximum reverse channel transmit power need not be constrained by the mobile device.

While some examples herein are described with operations in the category of mobile devices that are commonly referred to as cellular phones, embodiments may be implemented in any mobile communication device that may involve near-head operations. Examples of other devices may include any portable computing device that may provide wireless communication services via various networks and modalities. A wireless mobile communication device may be considered to be a user device which is configured for standardized operation on a wireless telecommunications network air interface and which is comprised of an integral earpiece for acoustical output of received forward channel audio signals. That is, the earpiece is housed in the same physical unit as the mobile device's transmitter. The earpiece may be typically characterized as having a relatively low level acoustic output that can only be reliably heard by the human user when the earpiece is in contact with, or at least in very close proximity to, the user's external ear structure.

Some mobile devices may also include a loudspeaker, which can provide acoustic output of a received forward channel audio signal at a relatively higher level so that it can be heard by the user, and possibly other persons, at some distance from the user's ear. In some devices the low level earpiece and the higher level loudspeaker may use the same audio output element. In this case, the common audio output element may be intended to act as an earpiece when driven by a relatively low level electric signal (so as to produce a relatively low level acoustic output) and as a loudspeaker when driven by a relatively high level electric signal (so as to produce a relatively high level acoustic output). It is reasonable to assume that in most cases where receive forward channel audio is output by an integral loudspeaker, the mobile communication device may be used at some minimum distance away from the user's (or any other person's) head.

A wireless mobile communication device may also be equipped to alternatively convey received reverse channel audio signals to a remote loudspeaker or to a remote headset which includes its own earpiece. Such remote devices may be connected to the mobile communication device by wires that carry the audio signal or, commonly using a standardized interface, by a very low power radio signal. In operations using a remote loudspeaker or headset, the mobile communication device may be an arbitrary distance from the user's head, up to a practical range of several meters. However it is reasonable to assume that when using such a remote audio output peripheral, the mobile communication device (including its transmitter) may likely be situated at some minimum distance from the user's (or any other person's) head.

Some types of mobile device, such as those commonly called smartphones, may be used for purposes other than voice telephony, in which there is no reverse channel audio signal or in which a reverse channel audio signal is coincident with other reverse channel content such as video. When engaged in such other modes of communications or operations (e.g., displaying a video or other data), a mobile communication device may typically be held by its user at a distance from the user's head that allows for comfortable use of non-audio components of the user interface—for example manipulation of a keyboard or viewing of a screen. In such scenarios, it is also reasonable to assume that the mobile communication device may be situated at some minimum distance away from the user's (or any other person's) head.

Figure 3:
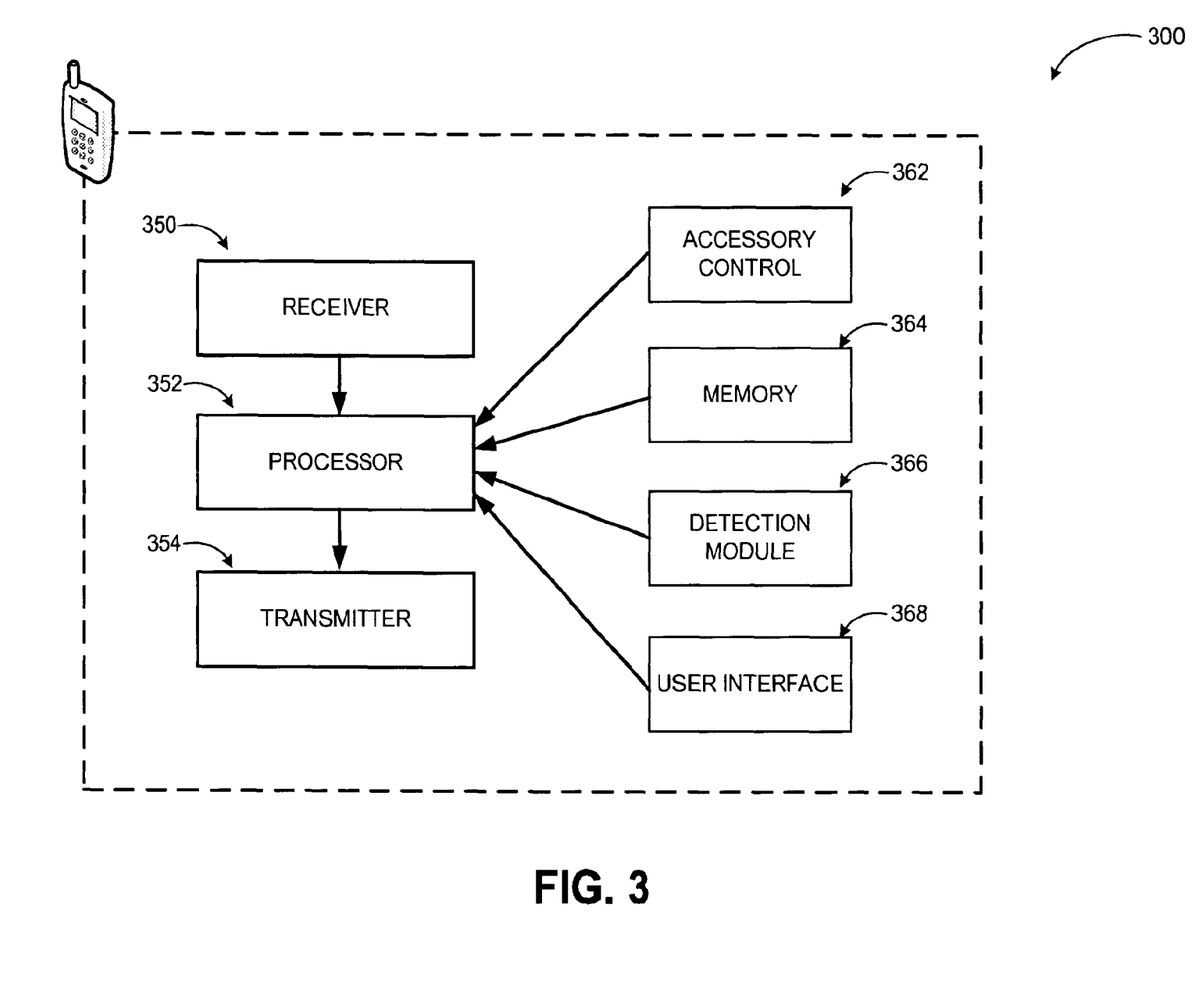
FIG. 3 illustrates a block diagram of a system for reducing cephalic radiation from a mobile communication device.

FIG. 3 illustrates a block diagram of a system for reducing cephalic radiation from a mobile communication device, arranged in accordance with at least some embodiments described herein.

A wireless mobile communication device typically includes a special purpose communication processor or a central processor that is, among other things, in control of the routing of received forward channel audio signals, or may at least have knowledge of the receive audio routing status. The processor may also either be in direct control of the device's instantaneous forward channel transmit power or may be able to constrain the maximum reverse channel transmit power that is controlled by a different processor within the device. In some embodiments, the maximum reverse channel transmit power may be constrained, with certain exceptions as discussed below, when the received forward channel audio signal is routed to the mobile device's integral earpiece.

Diagram 300 shows major functional components of a wireless mobile communication device relevant to some embodiments described herein. The mobile communication device may include a processor 352 that is coupled to a receiver 350 and a transmitter 354. The processor 352 may also be coupled to an accessory control module 362, a memory 364, a detection module 366, and a user interface control module 368. The accessory control module 362 may manage accessories associated with the mobile communication device such as remote speakers, headsets, etc. Instructions for performing various operations of the mobile communication device including, but not limited to, controlling maximum reverse channel transmit power levels based on operation or communication mode may be stored in the memory 364. The detection module 366 may detect various operational or communication modes of the device such as audio communication, display of data, and comparable operations. The user interface control module 368 may control user interfaces such as a display, speaker(s), microphone(s), etc.

One of the stages of adjusting the mobile device's maximum transmit power levels to control absorbed RF radiation in a user's head may include ascertaining a predetermined "safe" level for RF power density incident to the human head. This safe level may depend on certain variables associated with the wireless network on which the cellular phone is operating. In particular, the safe level may be different for different RF frequency bands. For network air interface types that involve intermittent transmission by a given user device on the reverse channel (for example, time domain multiplexed systems), safe levels may be expressed either on the basis of time-averaged power density level or peak power density level.

Determination of safe RF power density incident to the human head may be performed in a number of ways. For example, such levels might be imposed as government regulations or may be promulgated as recommended industry standards. Such standards and/or limits need not be expressed in terms of, but rather may be correlated to, mobile communication device transmit power. Alternatively, the manufacturer of a mobile communication device may select a value on the basis of competition with other manufacturers. Once a maximum safe RF power density incident to the human head is ascertained, the manufacturer of a particular model of cellular phone may, for each frequency band and mode of operation for which the mobile communication device is equipped to operate, determine a corresponding maximum reverse channel transmit power with the mobile communication device held against its user's ear (i.e. as would be typically oriented during "phone-to-the-ear" conversation).

It should be noted that maximum safe RF power density incident to the human head may be expressed as a relatively complex formula involving averages over various time periods, or may be expressed as a combination of such averages and a maximum peak power density. However expressed, the maximum safe RF power density incident to the human head may be correlated to a correspondingly expressed maximum reverse channel transmit power for near-head operation of the mobile device. For example, safe RF power density levels in the frequency bands most widely used within the United States for voice telephony reverse channels on wireless networks are specified by the Federal Communication Commission (FCC) as follows:

TABLE 1

Example RF power density limits

| Frequency Band (MHz) | RF Power Density Limits ($\mu W/cm^2$) |
| --- | --- |
| 824-849 | 550 |
| 1850-1910 | 1000 |

Analytical prediction of the RF power density incident to the user's head associated with a given transmitter power output of a cellular phone being held to his or her ear is a complex undertaking. The primary challenge is that in this case the user's head may be in the "near field" of the cellular phone's transmit antenna. However, this relationship can be reliably determined by empirical testing. Near field conditions may also exist for the case where the cellular phone is held approximately 0.3 meters away from the head. However, for purposes of determining an estimation of power density level the following far field formula may be used:

$$G = EIRP/(4*\pi*r^2), \qquad [1]$$

where
G is the power density in ($\mu W/cm^2$, EIRP is effective isotropic radiated power from the transmit antenna in $\mu W$, and R is the distance from the transmit antenna in cm.

In common cases, handheld cellular phones are capable of a maximum transmit power of approximately 200 mW, or +23 dBm. Since cellular phones are typically equipped with transmit antennas of approximately 0 dBi gain that is also their maximum EIRP. At full output of about +23 dBm, the EIRP of a cellular phone may then be 200,000 $\mu W$. With the cellular phone held approximately 0.3 meters (30 cm) away from the head, formula [1] suggests a power density incident to the head of about 18 $\mu W/cm^2$. This is well below the assumed safe level for both 800 and 1900 MHz bands, suggesting that cellular phones can safely operate at maximum transmit power when held at this moderate distance from the head.

For a cellular phone being held to the ear, distance between the transmit antenna and the nearest point of the user's ear may typically be approximately 2 cm. From formula [1], this yields a power density incident to the head of around 4,000 $\mu W/cm2$. This is obviously well above the levels assumed safe for purposes as defined by the FCC (and because of near-field effects the actual level is likely to be even higher). However, by constraining the transmit power, the resulting RF power density incident to the user's head may be reduced, proportionately, to a point where the power density is at or below safe levels. The amount of reduction of maximum transmit power may be about 9 dB in the case of 800 MHz operation and about 6 dB in the case of 1900 MHz operation.

In commonly used air interface technologies for voice telephony in wireless networks, reverse channel transmit power is controlled over a wide dynamic range by the serving network. The specific objectives of this reverse channel transmit power control are somewhat different in the different air interface technologies. Instructions on power control are typically sent, using various standardized protocols, on the forward channel. Cellular phones are bound by standards for interoperability to adhere to these instructions by setting or adjusting reverse channel transmit power as directed. Particularly in the case of networks using code domain multiple access (CDMA) air interface technology, it is common for cellular phones to transmit well below their maximum possible output. In fact, except in areas of particularly poor coverage, CDMA cellular phones engaged in a voice call may rarely operate at an average transmit power within 10 dB of maximum. Therefore, by constraining maximum transmit power for voice calls when received forward channel audio is routed to the integral earpiece (indicating likely phone-to-the-ear use), the transmit power control system according to some embodiments may only moderately impact the operation and performance of the cellular phone.

Performance and operational impact of transmit power reduction may be minimized by informing the serving network when, and to what extent, maximum transmit power is constrained. With this information, the network may manage the service provided to the cellular phone so as to minimize the operational impact of transmit power constraint. Appropriate protocols may be established within the standards governing air interface operation to allow such information to be passed from a cellphone to the serving network. For example, during the protocol exchanges associated with establishing a voice call, the cellular phone may transmit a message that includes the following elements: a flag indicating that maximum transmit power is constrained and/or a digitally encoded value indicating the maximum transmit level or the amount by which maximum power is constrained. In some cases it may be more efficient for standardized operation whereby the serving wireless network assumes that the maximum transmit power of each served mobile communication device is constrained, with standardized protocols used by mobile devices to inform the serving network when their maximum transmit power is not constrained. During the course of a voice call it may be possible that transmit power constraint may be invoked or removed, for example if the user switches from earpiece to loudspeaker mode or vice versa, respectively. These changes may then be accompanied by appropriate protocol messages sent by the cellphone to inform the serving network of the changes.

In some embodiments, an indication may be provided to the user, for example with a series of brief and subtle audio tones, when the mobile device's transmit power is at or near its maximum constrained value. These tones may indicate to the user that quality of the call currently in progress might be impacted by transmit power constraint. The user may then decide, for example, to switch to speaker mode in order to remove transmit power constraint and thus restore call quality.

In other embodiments, the mobile communication device may be equipped with means whereby the maximum power that the cellphone can transmit when under constraint is a programmable value stored in the mobile device's non-volatile memory. This may allow the maximum transmit power for near-head operation to be adjusted. This adjustment may accommodate such factors as whether the user of the device is a child or an adult (and where safe power density levels are different for adults and children). The determination of whether the user is an adult or child may be based on user credentials, restrictions placed on the device (e.g., calling restrictions), or similar information. The programmed maximum constrained transmit power may also be adjusted to accommodate changes in regulatory or industry standards regarding safe incident power density levels. For mobile devices that can operate on different frequency bands and/or using different air interface technologies, multiple stored values for maximum constrained transmit power level may be required.

In further embodiments, rather than constraining transmit power of the mobile device, the user may be provided with an indication, for example with audio tones, when transmit power is at a level that might cause unsafe RF power density incident to his or her head. The user can then make an informed decision as to whether to continue the call or to change to a safer operating mode (such as using the mobile device's loudspeaker rather than its earpiece).

In yet other embodiments, rather than constraining mobile communication device transmit power to a specific maximum level, it may be constrained to a maximum average value with averaging over a certain period of time. This time period may be within the duration of a current call. For example, average transmit power may be constrained over any given one minute period. Alternatively, the averaging period may be a longer period, for example a 24 hour period that includes multiple voice calls. This time averaging, and the variability in averaging time, may accommodate determinations that what constitutes safe exposure to RF signals may be defined on average rather than, or in addition to, instantaneous levels.

Some other example implementations may include adapting the constraining of the transmit power to allow for brief spikes in power so as to accommodate rapidly changing conditions on the air interface or such operations as the cellphone transmitting probes on a CDMA access channel. Maximum transmit power constraint may also be suspended during voice calls to particular telephone numbers associated with emergency services, for example calls to 911. Maximum transmit power constraint may further be suspended by the serving network through the use of appropriate messaging protocols. In some example implementations the user may be able to temporarily suspend maximum transmit power constraint by means of a predetermined input through the user interface.

While embodiments have been discussed above using specific examples, components, scenarios, and configurations in FIG. 1 through FIG. 3, they are intended to provide a general guideline to be used for reducing cephalic radiation from mobile communication devices. These examples do not constitute a limitation on the embodiments, which may be implemented using other components, schemes, and configurations using the principles described herein.

Figure 4:
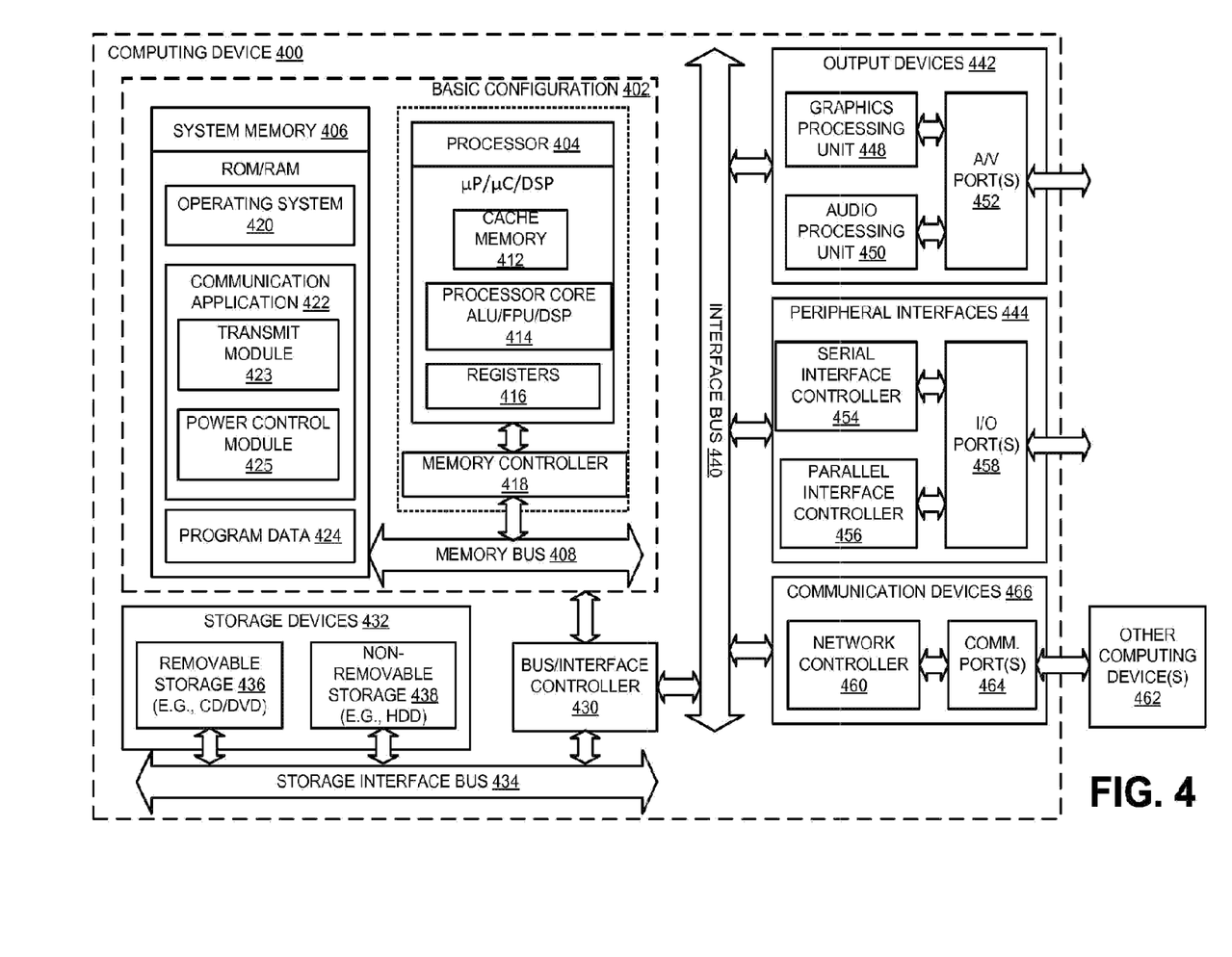
FIG. 4 illustrates a general purpose computing device, which may be employed in a mobile communication device with cephalic radiation absorption reduction.

FIG. 4 illustrates a general purpose computing device, which may as a mobile communication device with reduction of cephalic absorption of radiation, arranged in accordance with at least some embodiments described herein. In a very basic configuration 402, computing device 400 may be a wireless mobile communication device and typically include one or more processors 404 and a system memory 406. A memory bus 408 may be used for communicating between processor 404 and system memory 406.

Depending on the desired configuration, processor 404 may be of any type including but not limited to a microprocessor (g), a microcontroller (μC), a digital signal processor (DSP), or any combination thereof. Processor 404 may include one more levels of caching, such as a cache memory 412, a processor core 414, and registers 416. Example processor core 414 may include an arithmetic logic unit (ALU), a floating point unit (FPU), a digital signal processing core (DSP Core), or any combination thereof. An example memory controller 418 may also be used with processor 404, or in some implementations memory controller 415 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420 and a communication application 422, which may include a transmit module 423 for controlling a wireless transmitter on the computing device 400 and a power control module 425 for constraining transmitted power in order to reduce absorbed cephalic radiation from the computing device 400 as described herein. System memory 406 may further include program data 424. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 466 to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 466 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as any mobile communication device or controller that controls a mobile communication device. Thus, computing device 400 may be a smart phone, a handheld computer with communication capability, a wearable computer with communication capability, and so on. Computing device 400 may perform a variety of generic or special purpose computing tasks in addition to facilitating wireless communications.

Networks for a networked system including computing device 400 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 5:
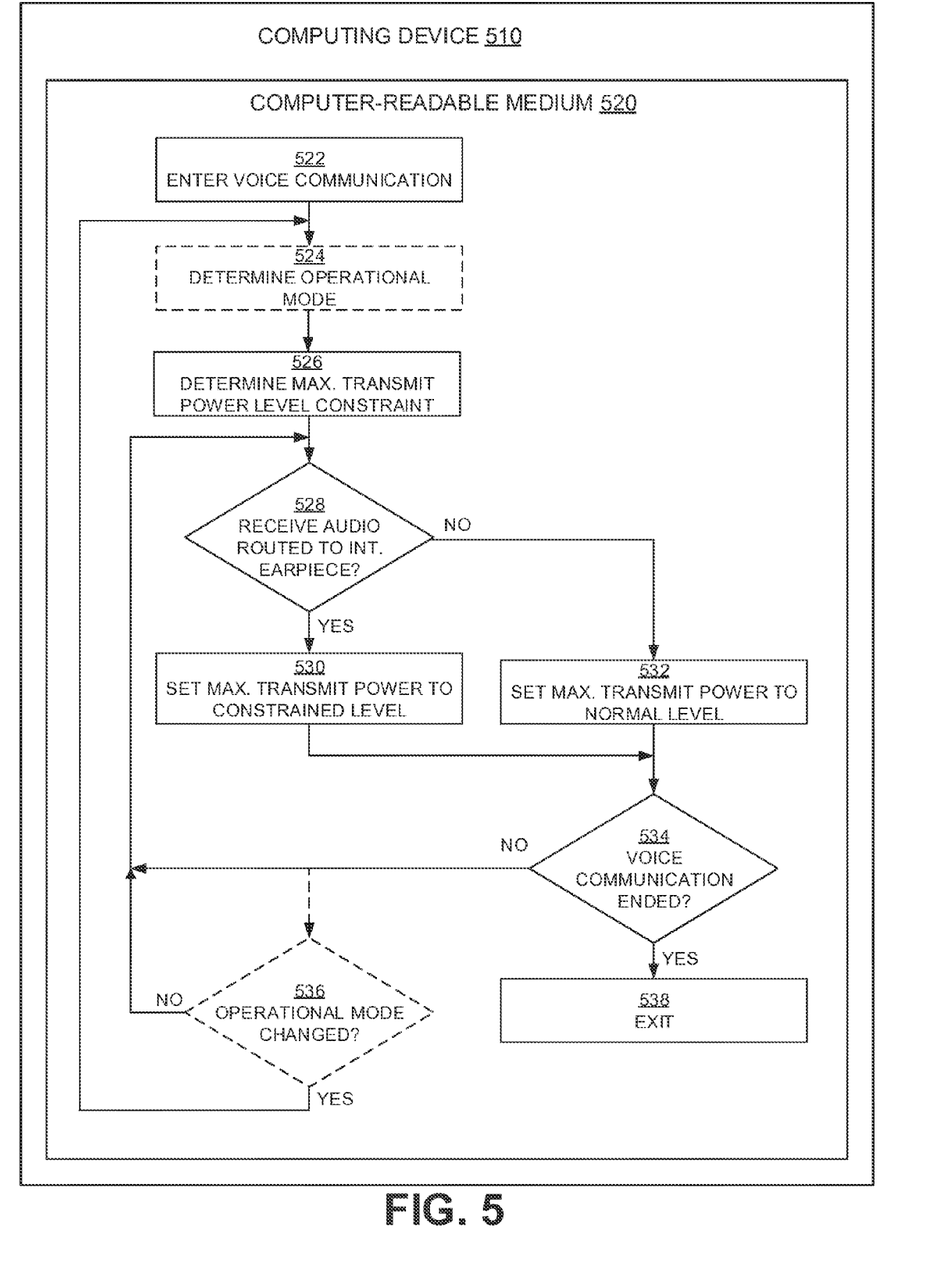
FIG. 5 is a flow diagram illustrating an example method for reducing cephalic radiation absorption from mobile communication devices that may be performed by a computing device such as the device in FIG. 4.

FIG. 5 is a flow diagram illustrating an example method for reducing cephalic absorption of radiation from mobile communication devices that may be performed by a computing device such as the processor 352 in a mobile communication device, arranged in accordance with at least some embodiments described herein. Example methods may include one or more operations, functions or actions as illustrated by one or more of blocks 522 through 538. The operations described in the blocks 522 through 538 may also be stored as computer-executable instructions in a computer-readable medium such as a computer-readable medium 520 of a computing device 510.

An example process of reducing radiation absorption near the head from mobile communication devices may begin with block 522, "ENTER VOICE COMMUNICATION", where the mobile communication device begins voice communication operation, for example upon establishment of a voice telephone call.

Optional Block 524, "DETERMINE OPERATIONAL MODE" follows block 522 and may be employed if the mobile communication device is capable of operation in different modes, for example on different frequency bands or using different air interface technologies. If so, the mobile communication device may determine the operational mode in which it is then configured to operate.

Block 526 "DETERMINE MAXIMUM TRANSMIT POWER LEVEL CONSTRAINT" follows optional block 524. The mobile communication device may determine, based upon preprogrammed values and/or determinations made at optional block 524, the level to which its maximum transmit power level may be constrained if such constraint is required by subsequent operations.

Decision operation 528 "RECEIVE AUDIO ROUTED TO INTERNAL EARPIECE?" follows block 526. It may also be reached in a loop from decision operations 534 or 536. The mobile communication device may determine if the receive audio (i.e. the audio signal it recovers from the received forward channel) is currently being routed to the device's integral earpiece. If so, operation moves to block 530, and if not to block 532.

At block 530 "SET MAXIMUM TRANSMIT POWER TO CONSTRAINED LEVEL", which is reached if the mobile device's receive audio is routed to its integral earpiece, the mobile communication device may, if it has not already done so, configure its transmit power control operation so as to limit the maximum transmit power to the constrained level determined at block 526.

At block 532 "SET MAXIMUM TRANSMIT POWER TO NORMAL LEVEL", which is reached if the mobile device's receive audio is not routed to its integral earpiece, the mobile communication device may configure its transmit power control operation for normal operation if not already so configured.

Decision operation 534 "VOICE COMMUNICATION ENDED?" follows either block 530 or block 532. The mobile communication device may determine if the voice communication has ended, for example by the conclusion of a voice telephone call. If so, operation moves to block 538 where the mobile communication device exits from reducing cephalic absorption of radiation. If not, operation moves to optional decision operation 536 or, if decision operation 536 is not employed, loops back to decision operation 528.

Optional decision operation 536 "OPERATIONAL MODE CHANGED?" follows decision operation 534 while the voice communication continues. Like block 524 it may be employed if the mobile communication device is capable of operation in different modes. In the uncommon situation where operational mode has changed, for example if the mobile communication device has been instructed to change to a different frequency band while engaged in a voice call, operation then loops to optional block 524. Otherwise it loops to decision operation 528.

The operations included in the processes of FIG. 5 described above are for illustration purposes. Reduction of cephalic absorption of radiation from mobile communication devices may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 6:
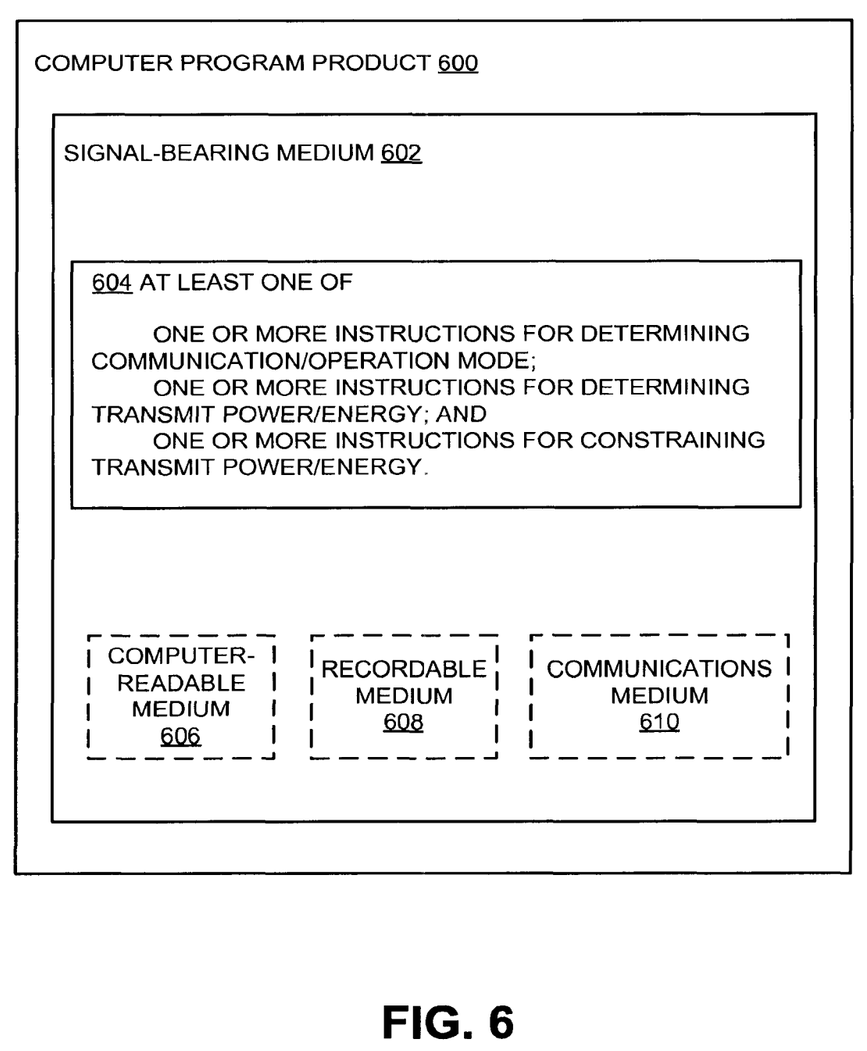
FIG. 6 illustrates a block diagram of an example computer program product, all arranged in accordance with at least some embodiments described herein.

FIG. 6 illustrates a block diagram of an example computer program product, arranged in accordance with at least some embodiments described herein. In some examples, as shown in FIG. 6, a computer program product 600 may include a signal bearing medium 602 that may also include machine readable instructions 604 that, when executed by, for example, a processor, may provide the functionality described above with respect to FIG. 1 through FIG. 3. Thus, for example, referring to processor 404, one or more of the tasks shown in FIG. 6 may be undertaken in response to instructions 604 conveyed to the processor 404 by medium 602 to perform actions associated with reduction of cephalic radiation absorption as described herein. Some of those instructions may include determining a communication or operation mode, determining a transmit power or energy, and constraining the transmit power or energy.

In some implementations, signal bearing medium 602 depicted in FIG. 6 may encompass a computer-readable medium 606, such as, but not limited to, a hard disk drive, a Compact Disc (CD), a Digital Versatile Disk (DVD), a digital tape, memory, etc. In some implementations, signal bearing medium 602 may encompass a recordable medium 608, such as, but not limited to, memory, read/write (R/W) CDs, R/W DVDs, etc. In some implementations, signal bearing medium 602 may encompass a communications medium 610, such as, but not limited to, a digital and/or an analog communication medium (e.g., a fiber optic cable, a waveguide, a wired communications link, a wireless communication link, etc.). Thus, for example, computer program product 600 may be conveyed to the processor 404 by an RF signal bearing medium 602, where the signal bearing medium 602 is conveyed by a wireless communications medium 610 (e.g., a wireless communications medium conforming with the IEEE 802.11 standard).

According to some examples, a method for reducing cephalic absorption of RF radiation from mobile communication devices may include determining an operation mode of a mobile communication device; determining whether the operation mode involves a near-head operation; and if the operation mode of the mobile communication device involves the near-head operation, reducing a maximum transmit power of the mobile communication device from a first level to a second level.

The near-head operation may be determined based on an audio signal being routed to an integral earpiece of the mobile communication device. The non-near-head operation may include one or more of: a video communication, a display operation, a non-voice communication operation, an audio signal being routed to an integral loudspeaker, the audio signal being routed to an external loudspeaker, and/or the audio signal being routed to a remote earpiece. The second level may be determined based on one or more of a regulatory safety standard, an industry standard, a manufacturer determined limit, and/or a customer specification.

The method may also include adjusting the second level based on at least one from a set of: a type of an antenna employed by the mobile communication device, an orientation of the antenna employed by the mobile communication device, an enclosure of the mobile communication device, the frequency band on which the mobile communication device is operating, and a characteristic of a reverse channel transmitted by the mobile communication device comprising one or more of a bandwidth, a modulation, and a duty cycle.

The method may also include determining whether the mobile communication device is used by one of an adult and a child and adjusting the second level based on whether the mobile communication device is used by one of an adult and a child. The method may further include determining at least one of a beginning and a termination of the near-head operation and setting the maximum transmit power to one of the second level and the first level, respectively. The method may yet further include providing an indication to a wireless network serving the mobile communication device when the maximum transmit power is changed between the first level and the second level, such indication including at least one of a flag and a digitally encoded value, where the flag indicates whether a maximum transmit value is set to the second level and the digitally encoded value indicates a current maximum transmit power.

The method may also include reducing cephalic absorption of radiation by one or more of: reducing a maximum peak transmit power level and reducing a maximum time-averaged transmit power level. The method may also include providing an indication to a user that the mobile communication device is operating in a constrained maximum transmit power mode, where the indication includes one or more of: one or more audible tones, a visual indication, and/or a tactile indication.

The method may further include one or more of: adjusting a maximum transmit power level in the constrained maximum transmit power mode to allow for brief spikes in transmit power in order to accommodate rapidly changing conditions of an air interface or for transmission of "probe" signals; increasing the maximum transmit power to the first level during the near-head operation to allow for an emergency call; increasing the maximum transmit power to the first level during the near-head operation upon receiving a message to that effect from a wireless network serving the mobile communication device; and increasing the maximum transmit power to the first level during the near-head operation upon a predetermined action by the user.

According to other examples, a mobile communication device adapted to provide communication services may include a transceiver module, a memory, and a processor coupled to the transceiver module and the memory. The processor may execute instructions stored in the memory, determine an operation mode of a mobile communication device; determine whether the operation mode involves a near-head operation; and if the operation mode of the mobile communication device involves the near-head operation, reduce a maximum transmit power from a first level to a second level.

The near-head operation may be determined based on an audio signal being routed to an integral earpiece of the mobile communication device. The non-near-head operation may include one or more of: a video communication, a display operation, a non-voice communication operation, an audio signal being routed to an integral loudspeaker, the audio signal being routed to an external loudspeaker, and/or the audio signal being routed to a remote earpiece. The second level may be determined based on one or more of a regulatory safety standard, an industry standard, a manufacturer determined limit, and/or a customer specification.

The processor may also adjust the second level based on at least one from a set of: a type of an antenna employed by the mobile communication device, an orientation of the antenna employed by the mobile communication device, an enclosure of the mobile communication device, the frequency band on which the mobile communication device is operating, and a characteristic of a reverse channel transmitted by the mobile communication device comprising one or more of a bandwidth, a modulation, and a duty cycle.

The processor may further determine whether the mobile communication device is used by one of an adult and a child and adjust the second level based on whether the mobile communication device is used by one of an adult and a child. The processor may determine at least one of a beginning and a termination of the near-head operation and set the maximum transmit power to one of the second level and the first level, respectively. The processor may also provide an indication to a wireless network serving the mobile communication device when the maximum transmit power is changed between the first level and the second level, such indication including at least one of a flag and a digitally encoded value, where the flag indicates whether a maximum transmit value is set to the second level and the digitally encoded value indicates a current maximum transmit power.

The processor may reduce cephalic absorption of radiation by one or more of: reducing a maximum peak transmit power level and reducing a maximum time-averaged transmit power level. The processor may provide an indication to a user that the mobile communication device is operating in a constrained maximum transmit power mode, where the indication includes one or more of: one or more audible tones, a visual indication, and/or a tactile indication.

The processor may further adjust a maximum transmit power level in the constrained maximum transmit power mode to allow for one or more of: brief spikes in transmit power in order to accommodate rapidly changing conditions of an air interface or for transmission of "probe" signals; increase the maximum transmit power to the first level during the near-head operation to allow for an emergency call; increase the maximum transmit power to the first level during the near-head operation upon receiving a message to that effect from a wireless network serving the mobile communication device; and increase the maximum transmit power to the first level during the near-head operation upon a predetermined action by the user.

According to further examples, a computer-readable storage medium may have instructions stored thereon for reducing cephalic absorption of RF radiation from mobile communication devices. The instructions may include determining an operation mode of a mobile communication device; determining whether the operation mode involves a near-head operation; and if the operation mode of the mobile communication device involves the near-head operation, reducing a maximum transmit power of the mobile communication device from a first level to a second level.

The near-head operation may be determined based on an audio signal being routed to an integral earpiece of the mobile communication device. The non-near-head operation may include one or more of: a video communication, a display operation, a non-voice communication operation, an audio signal being routed to an integral loudspeaker, the audio signal being routed to an external loudspeaker, and/or the audio signal being routed to a remote earpiece. The second level may be determined based on one or more of a regulatory safety standard, an industry standard, a manufacturer determined limit, and/or a customer specification.

The instructions may also include adjusting the second level based on at least one from a set of: a type of an antenna employed by the mobile communication device, an orientation of the antenna employed by the mobile communication device, an enclosure of the mobile communication device, the frequency band on which the mobile communication device is operating, and a characteristic of a reverse channel transmitted by the mobile communication device comprising one or more of a bandwidth, a modulation, and a duty cycle.

The instructions may also include determining whether the mobile communication device is used by one of an adult and a child and adjusting the second level based on whether the mobile communication device is used by one of an adult and a child. The instructions may further include determining at least one of a beginning and a termination of the near-head operation and setting the maximum transmit power to one of the second level and the first level, respectively. The instructions may yet further include providing an indication to a wireless network serving the mobile communication device when the maximum transmit power is changed between the first level and the second level, such indication including at least one of a flag and a digitally encoded value, where the flag indicates whether a maximum transmit value is set to the second level and the digitally encoded value indicates a current maximum transmit power.

The instructions may also include reducing cephalic absorption of radiation by one or more of: reducing a maximum peak transmit power level and reducing a maximum time-averaged transmit power level. The instructions may also include providing an indication to a user that the mobile communication device is operating in a constrained maximum transmit power mode, where the indication includes one or more of: one or more audible tones, a visual indication, and/or a tactile indication.

The instructions may further include adjusting a maximum transmit power level in the constrained maximum transmit power mode to allow for one or more of: brief spikes in transmit power in order to accommodate rapidly changing conditions of an air interface or for transmission of "probe" signals; increasing the maximum transmit power to the first level during the near-head operation to allow for an emergency call; increasing the maximum transmit power to the first level during the near-head operation upon receiving a message to that effect from a wireless network serving the mobile communication device; and increasing the maximum transmit power to the first level during the near-head operation upon a predetermined action by the user.

According to yet other examples, a network controller for a wireless network facilitating wireless communications between base stations of the wireless network and mobile communication devices may be adapted to cause reduction of cephalic absorption of radiation. The network controller may include a memory and a processor coupled to the memory. By executing instructions stored in the memory, the processor may receive an indication from a mobile communication device through one of direct means and indirect means that the mobile communication device is operating in a constrained maximum transmit power mode based on the mobile communication device determining an operation mode that involves a near-head operation, and adjust at least one from a set of: one or more operations, one or more configurations, and/or one or more parameters of the network to accommodate a reduced maximum transmit power from the mobile communication device.

The indication may include at least one of a flag and a digitally encoded value received from the mobile communication device. Adjustment of at least one from a set of: one or more operations, one or more configurations, and/or one or more parameters of the network may include increasing a sensitivity of a receiver in a base station communicating with the mobile communication device. The processor may suspend the constrained maximum transmit power mode of the mobile communication device by transmitting a message to the mobile communication device.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one skilled in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to reduce cephalic absorption of radio frequency (RF) radiation from a mobile communication device, the method comprising:

determining an operation mode of the mobile communication device;

determining whether the operation mode involves a near-head operation;

in response to a determination that the operation mode of the mobile communication device involves the near-head operation,
  determining a maximum transmit power level in a constrained maximum transmit power mode based on programmable values and determinations made at the operation mode;
  adjusting the maximum transmit power level in the constrained maximum transmit power mode to allow for brief spikes in transmit power in order to accommodate rapidly changing conditions of an air interface of a mobile communication device base station; and
  reducing the maximum transmit power of the mobile communication device to lower RF power density in the near-head operation from a first level to or below a second level, wherein the second level includes the constrained maximum transmit power mode;

providing an indication to a user that the mobile communication device is operating in the constrained maximum transmit power mode, wherein the indication includes a tactile indication that indicates an amount by which the maximum transmit power level is constrained;

in response to a determination that the operation mode of the mobile communication device involves a non-near-head operation that includes one or more of: a video communication, a display operation, a non-voice communication operation, an audio signal being routed to an integral loudspeaker, the audio signal being routed to an external loudspeaker, and the audio signal being routed to a remote earpiece, maintaining the maximum transmit power of the mobile communication device at the first level;

in response to a switch of the operation mode from an earpiece mode to a loudspeaker mode, invoking a transmit power constraint;

in response to another switch to the operation mode from the loudspeaker mode to the earpiece mode, revoking the transmit power constraint; and sending a protocol message to inform a change in the operation mode to the mobile communication device.

2. The method according to claim 1, wherein the near-head operation is determined based on the audio signal being routed to an integral earpiece of the mobile communication device.

3. The method according to claim 1, wherein the second level is determined based on one or more of a regulatory safety standard, an industry standard, a manufacturer determined limit, and/or a customer specification.

4. The method according to claim 1, further comprising:
adjusting the second level based on at least one from a set of: a type of an antenna employed by the mobile communication device, an orientation of the antenna employed by the mobile communication device, an enclosure of the mobile communication device, a frequency band on which the mobile communication device is operating, and a characteristic of a reverse channel transmitted by the mobile communication device comprising one or more of a bandwidth, a modulation, and a duty cycle.

5. The method according to claim 1, further comprising:
determining whether the mobile communication device is used by one of an adult and a child; and
adjusting the second level based on whether the mobile communication device is used by one of an adult and a child.

6. A mobile communication device adapted to provide communication services, the mobile communication device comprising:
a transceiver module;
a memory; and
a processor coupled to the transceiver module and the memory, the processor executing instructions stored in the memory, wherein the processor is configured to:
determine an operation mode of the mobile communication device;
determine whether the operation mode involves a near-head operation;
in response to a determination that the operation mode of the mobile communication device involves the near-head operation,
determine a maximum transmit power level in a constrained maximum transmit power mode based on programmable values and determinations made at the operation mode;
adjust the maximum transmit power level in the constrained maximum transmit power mode to allow for brief spikes in transmit power in order to accommodate rapidly changing conditions of an air interface of a mobile communication device base station; and
reduce the maximum transmit power to lower radio frequency (RF) power density in the near-head operation from a first level to or below a second level, wherein the second level includes the constrained maximum transmit power mode;
provide an indication to a user that the mobile communication device is operating in the constrained maximum transmit power mode, wherein the indication includes a tactile indication that indicates an amount by which the maximum transmit power level is constrained;
in response to a determination that the operation mode of the mobile communication device involves a non-near-head operation that includes one or more of: a video communication, a display operation, a non-voice communication operation, an audio signal being routed to an integral loudspeaker, the audio signal being routed to an external loudspeaker, and the audio signal being routed to a remote earpiece, maintain the maximum transmit power of the mobile communication device at the first level;
in response to a switch of the operation mode from an earpiece mode to a loudspeaker mode, invoke a transmit power constraint;
in response to another switch to the operation mode from the loudspeaker mode to the earpiece mode, revoke the transmit power constraint; and
send a protocol message to inform a change in the operation mode to the mobile communication device.

7. The mobile communication device according to claim 6, wherein the processor is further configured to:
determine at least one of a beginning and a termination of the near-head operation; and
set the maximum transmit power to one of the second level and the first level, respectively.

8. The mobile communication device according to claim 7, further comprising:
provide the indication to a wireless network serving the mobile communication device when the maximum transmit power is changed between the first level and the second level, such indication that includes at least one of a flag and a digitally encoded value, wherein the flag indicates whether a maximum transmit value is set to the second level and the digitally encoded value indicates a current maximum transmit power.

9. The mobile communication device according to claim 6, wherein the processor is further configured to:
reduce cephalic absorption of radiation by one or more of: reducing a maximum peak transmit power level and reducing a maximum time-averaged transmit power level.

10. The mobile communication device according to claim 6, wherein the indication includes one or more of: one or more audible tones, and a visual indication.

11. The mobile communication device according to claim 6, wherein the mobile communication device is one of: a handheld communication device, a smartphone, a cellular phone, a wearable communication device, and a special purpose device with communication capability.

12. A non-transitory computer-readable storage device having instructions stored thereon to reduce cephalic absorption of radiation from a mobile communication device, the instructions comprising:
determining an operation mode of the mobile communication device;
determining whether the operation mode involves a near-head operation;
in response to a determination that the operation mode of the mobile communication device involves the near-head operation,
determining a maximum transmit power level in a constrained maximum transmit power mode based on programmable values and determinations made at the operation mode;
adjusting the maximum transmit power level in the constrained maximum transmit power mode to allow for brief spikes in transmit power in order to accommodate rapidly changing conditions of an air interface of a mobile communication device base station; and
reducing the maximum transmit power of the mobile communication device to lower RF power density in the near-head operation from a first level to or below a second level, wherein the second level includes the constrained maximum transmit power mode;

providing an indication to a user that the mobile communication device is operating in the constrained maximum transmit power mode, wherein the indication includes a tactile indication that indicates an amount by which the maximum transmit power level is constrained;

in response to a determination that the operation mode of the mobile communication device involves a non-near-head operation that includes one or more of: a video communication, a display operation, a non-voice communication operation, an audio signal being routed to an integral loudspeaker, the audio signal being routed to an external loudspeaker, and the audio signal being routed to a remote earpiece, maintaining the maximum transmit power of the mobile communication device at the first level;

in response to a switch of the operation mode from an earpiece mode to a loudspeaker mode, invoking a transmit power constraint;

in response to another switch to the operation mode from the loudspeaker mode to the earpiece mode, revoking the transmit power constraint; and sending a protocol message to inform a change in the operation mode to the mobile communication device.

13. The non-transitory computer-readable storage device according to claim 12, wherein the instructions further comprise:

adjusting the maximum transmit power level in the constrained maximum transmit power mode to allow for the brief spikes in the transmit power in order to accommodate rapidly changing conditions for transmission of "probe" signals.

14. The non-transitory computer-readable storage device according to claim 12, wherein the instructions further comprise:

increasing the maximum transmit power to the first level during the near-head operation to allow for an emergency call.

15. The non-transitory computer-readable storage device according to claim 12, wherein the instructions further comprise:

increasing the maximum transmit power to the first level during the near-head operation upon receiving a message to that effect from a wireless network that serves the mobile communication device.

16. The non-transitory computer-readable storage device according to claim 12, wherein the instructions further comprise:

increasing the maximum transmit power to the first level during the near-head operation upon a predetermined action by a user.

17. A network controller for a wireless network that facilitates wireless communications between base stations of the wireless network and a mobile communication device adapted to cause reduction of cephalic absorption of radiation, the network controller comprising:

a memory; and a processor coupled to the memory, the processor executing instructions stored in the memory, wherein the processor is configured to:

in response to a determination that an operation mode of the mobile communication device involves a near-head operation, determine a maximum transmit power level in a constrained maximum transmit power mode based on programmable values and determinations made at the operation mode of the mobile communication device;

adjust the maximum transmit power level in the constrained maximum transmit power mode to allow for brief spikes in transmit power in order to accommodate rapidly changing conditions of an air interface of a mobile communication device base station;

receive an indication from the mobile communication device that the mobile communication device is operating in the constrained maximum transmit power mode, wherein the indication includes a tactile indication that indicates an amount by which the maximum transmit power level is constrained;

adjust at least one from a set of: a network operation, a network configuration, and a network parameter to lower radio frequency (RF) power density in the near-head operation and to accommodate a reduced maximum transmit power from the mobile communication device;

in response to a switch of the operation mode from an earpiece mode to a loudspeaker mode, invoking a transmit power constraint;

in response to a switch to the operation mode from the loudspeaker mode to the earpiece mode, revoking the transmit power constraint; and send a protocol message to inform a change in the operation mode to the mobile communication device.

18. The network controller according to claim 17, wherein the adjustment includes increasing a sensitivity of a receiver in the base stations that communicate with the mobile communication device.

19. The network controller according to claim 17, wherein the processor is configured to suspend the constrained maximum transmit power mode of the mobile communication device by a transmission of the message to the mobile communication device.

* * * * *